(12) United States Patent
Hazen

(10) Patent No.: US 8,152,425 B2
(45) Date of Patent: Apr. 10, 2012

(54) APPARATUS FOR SECURING HEAVY COLUMNAR CONSTRUCTION MEMBERS, INCLUDING OILFIELD TUBULARS, TO A TRANSPORTING CONVEYANCE AND METHOD OF USING THE SAME

(76) Inventor: Michael Hazen, Bakersfield, CA (US)

( * ) Notice: Subject to any disclaimer, the term of this patent is extended or adjusted under 35 U.S.C. 154(b) by 119 days.

(21) Appl. No.: 12/759,904

(22) Filed: Apr. 14, 2010

(65) Prior Publication Data

US 2010/0329808 A1   Dec. 30, 2010

Related U.S. Application Data

(60) Provisional application No. 61/269,959, filed on Jun. 30, 2009.

(51) Int. Cl.
*B60P 7/08* (2006.01)
(52) U.S. Cl. ............... 410/36; 410/37; 410/39; 410/42; 410/32; 280/144
(58) Field of Classification Search ............. 410/31, 410/32, 34, 35, 36, 37, 39, 40, 42, 47, 120; 248/68.1; 211/70.4; 280/143, 144, 404; 206/443
See application file for complete search history.

(56) References Cited

U.S. PATENT DOCUMENTS 7,306,414 B2 * 12/2007 Bohac et al. ............ 410/36

* cited by examiner

*Primary Examiner* — Stephen Gordon
(74) *Attorney, Agent, or Firm* — James M. Duncan, Esq.; Klein, DeNatale, Goldner, et al.

(57) ABSTRACT

A pair of pipe bunks are utilized on in combination with a flatbed truck, deck of a work boat, or other conveyance means for securing loads of long, heavy, structural members during transportation. The pipe bunks have particular utility for oilfield tubulars. Each pipe bunk comprises a horizontal base member which is attached cross-wise to the flatbed of the truck, or deck of the workboat. A horizontal beam is attached to the horizontal base member and a vertical member is affixed to each opposing outside end of the horizontal beam. Adjustable slide members are slidingly attached to the horizontal base member, where each adjustable slide member has a vertical member which is disposed in offset facing relation with a respective outside vertical member. The slide members are attached to the horizontal base member with guide members. The slide members are adjustable with respect to the distance of each from the respective outside vertical member to accommodate the width of the desired load. The slide members are locked into position to secure the relative position of the slide members with the respective outside vertical members.

11 Claims, 10 Drawing Sheets

APPARATUS FOR SECURING HEAVY COLUMNAR CONSTRUCTION MEMBERS, INCLUDING OILFIELD TUBULARS, TO A TRANSPORTING CONVEYANCE AND METHOD OF USING THE SAME

CROSS-REFERENCE TO RELATED APPLICATION

U.S. Provisional Application No. 61/269,959 for this invention was filed on Jun. 30, 2009, for which application this inventor claims domestic priority.

BACKGROUND OF THE INVENTION

The present invention generally relates to the transportation of heavy columnar construction members, including oilfield tubing, casing, drill pipe, drill collars, line pipe, columnar piles and similar materials. The present invention more specifically relates to various embodiments of an apparatus and a method for securing such heavy columnar members, and facilitating the loading and unloading of such heavy columnar members from the transporting conveyance, typically a flat-bed trailer, but also including the deck of a supply boat, or other conveyance. While the disclosed apparatus and method have application in transporting other types of heavy columnar members, the apparatus and method have direct application to the transporting of oil tubulars, including tubing, casing, drill pipe, drill collars, line pipe, etc., which are hereinafter collectively referred to as "tubulars". The tubulars are utilized in the drilling, completion and production of oil and gas wells from both onshore and offshore locations.

Various sizes of tubulars are utilized in drilling, completion and production operations, usually ranging from diameters of 2⅜ inch to 24 inches or larger. These tubulars are typically in lengths of 31 feet and are manufactured from carbon steel and various alloys, and thus can be extremely heavy. The tubulars typically have threaded ends and couplings. Because the integrity of the threaded connections is critical, many different services are encountered, there are a variety of different threads which may be utilized on the tubulars, many of which are very expensive and which are easily damaged if handled incorrectly. Therefore transporting tubulars in a manner safe for both personnel and equipment can be challenging.

The handling of long and heavy tubulars utilized used in oil drilling, completion and production operations presents difficult problems and potential hazards to the persons involved in manipulating the tubulars and potential damage to property which may occur if the load comes loose or shifts during loading, transportation, or unloading. The tubulars may also be damaged, resulting in a substantial loss. Exotic materials may be required because of the hostile environments which may be encountered in the well, including acid-forming gases such as hydrogen sulfide and carbon dioxide. The tubulars may also comprise various coatings which are utilized for corrosion and/or wear resistance.

Oilfield tubulars are heavy, difficult to handle because of the weight, length, and shape, and are relatively expensive. Unfortunately, because oilfield tubulars are heavy and usually metallic, these items are often viewed by handling personnel as virtually indestructible. However the tubulars are not immune to damage from handling abuse. For example, threads can be damaged from impact with other tubulars, pipe racks, or the ground. Dents in tubulars can cause stress risers which can adversely impact the integrity of the material because of stress fatigue and/or impacting the corrosion resistance of the material, or damage the protective coatings used on the material. Because the tubulars are heavy, it can be very cumbersome and dangerous to move joints of pipe back and forth between the trailer and the pipe rack and/or rig floor.

Tubulars are frequently delivered to onshore well locations with flatbed pipe trailers. The pipe trailer typically has upright members on each side of the trailer which retain the tubulars within the trailer. The rows of pipe are separated by wood strips, typically 4×4 pieces of lumber. Additionally, chalks are nailed to the ends of each wood strip tubulars such that a chalk member is placed against the sides of the outside tubulars on the wood strip. The chalks prevent rolling and shifting of the load of pipe as it is being hauled. The tubulars are usually loaded on the trailer with a fork lift and off-loaded at the well site with slings which are attached to a line from a crane. In order to attach the slings to the pipe, it is necessary to wrap the sling around the pipe.

However, transporting tubulars with the known pipe trailers and utilizing the above procedure has several drawbacks. The entire load of pipe, which can weigh as much as 50,000 pounds or more, is contained by as few as four upright members on the outside edges of the flatbed trailer. An unplanned, and dangerous, release of pipe from the trailer can occur. For example, if the chalks on the outside of the pipe are knocked loose by shifting tubulars as the trailer goes around a turn, the entire load of pipe may impact the upright, potentially resulting in injury to persons and property, including damaging the pipe itself.

The known apparatus and method have additional disadvantages. For example, the process of installing the chalks can be time consuming as chalks are nailed down and are placed around the outside pieces of pipe of each row. Offloading the pipe can be time consuming and dangerous as well. Wrapping slings around the pipe requires the slings to be threaded around joints of tubulars. In order to thread a sling around the joints, the joints often need to be moved with pry bars in order to grasp an end of the sling as it is wrapped around the joint. Another problem is determining whether the weight of the tubulars has exceeded the load capacity of the trailer. An overloaded trailer presents a hazard to life and property.

For the above reasons, an alternative retaining system, also referred to as an adjustable pipe bunk, is disclosed herein.

SUMMARY OF THE INVENTION

The embodiments of the apparatus disclosed herein and the disclosed method provide a solution to the problems identified above. The apparatus comprises a pair of opposite facing pipe bunks which utilized in combination with a flatbed truck, deck of a work boat, or other conveyance means for securing loads of tubulars for transportation. The pipe bunks may be identical for ease of fabrication and operation. Each pipe bunk comprises a horizontal base member which is attached cross-wise (i.e., perpendicular to the long axis) to the flatbed of the truck, or deck of the workboat. A horizontal beam is attached to the horizontal base member and a vertical member is affixed to each opposing outside end of the horizontal beam.

Adjustable slide members are slidingly attached to the horizontal base member, where each adjustable slide member comprises an vertical member which is disposed in offset facing relation with a respective outside vertical member. The slide members are attached to the horizontal base member with guide members. The slide members are adjustable with respect to the distance of each from the respective outside vertical member to accommodate the desired load.

Locking means are utilized to secure the first inside support member and the second inside support member to their respective positions relative to the vertical risers on each side of the center horizontal member. When installed, the facing pipe bunks provide two segmented sections into which portions of heavy columnar construction members may be disposed, such that the columnar construction members are spanning between the front bunk and the rear bunk. Because the first inside support member and the second inside support member are adjustable with respect to the vertical risers and with respect to each other, the size of each segmented section is adjustable according to the size of the columnar construction member. For tubulars, this feature allows the segmented sections to be adjusted in accord with the outside diameter of the tubulars. Because a row of tubulars is supported on one side by two vertical risers, and on the second side by two vertical bracers, the need for chalking the pipe is eliminated, resulting in a substantial savings of time.

DETAILED DESCRIPTION OF THE EMBODIMENTS

Figure 1:
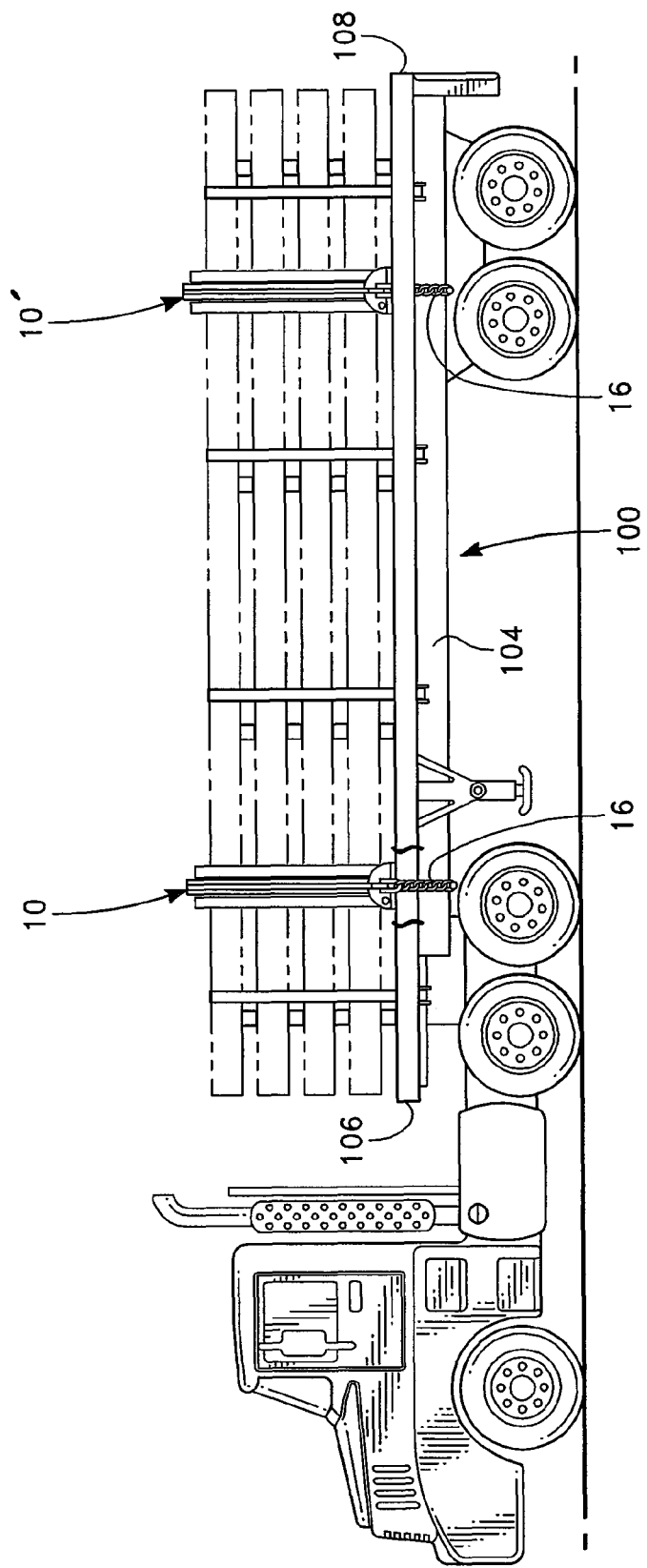
FIG. 1 shows a flatbed trailer typically utilized for transporting tubulars, equipped with the disclosed pipe bunks.
Figure 2:
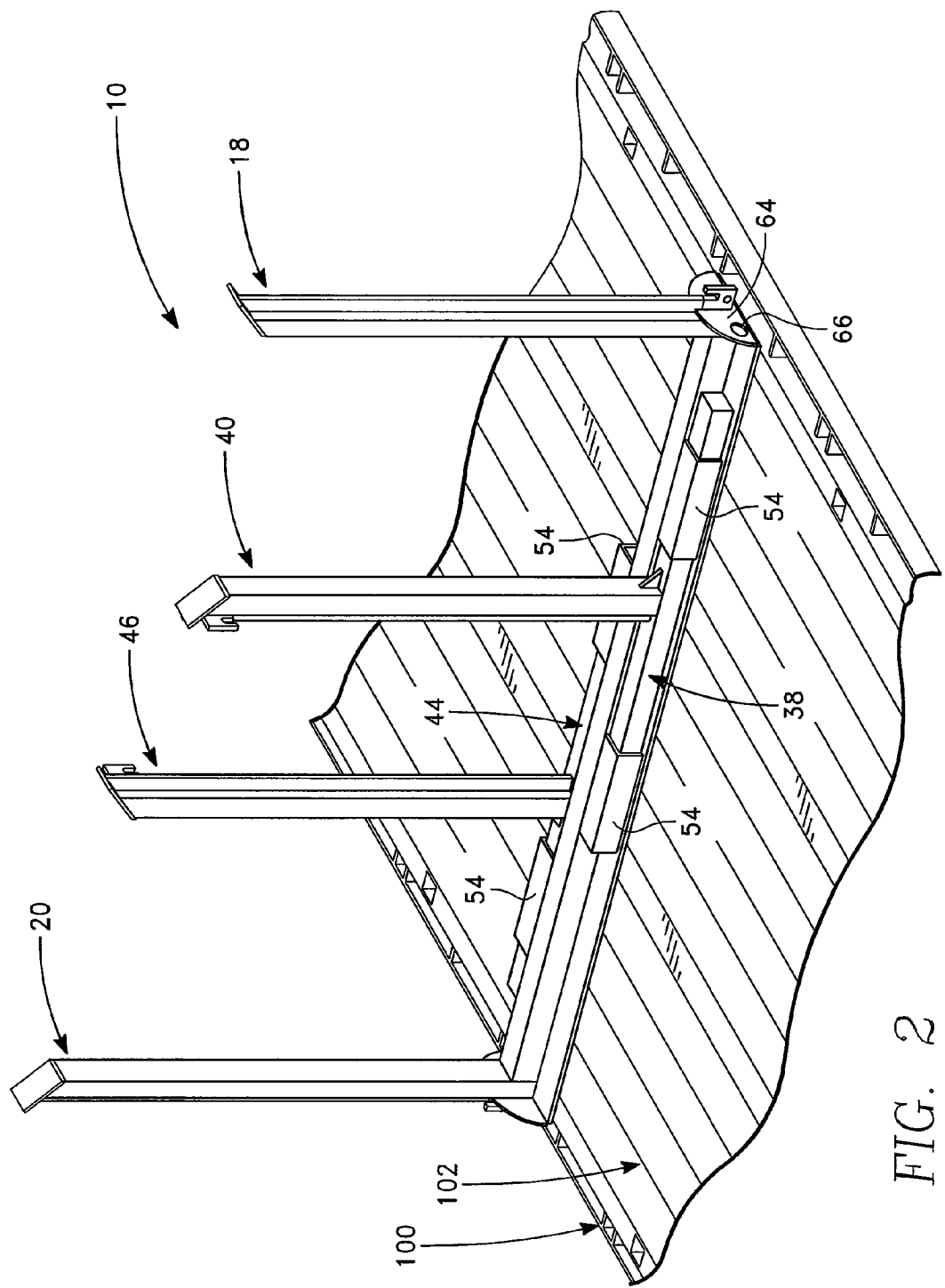
FIG. 2 is a perspective drawing showing one of a pair of the pipe bunks utilized in the present invention attached to the top side of a flat bed.
Figure 2A:
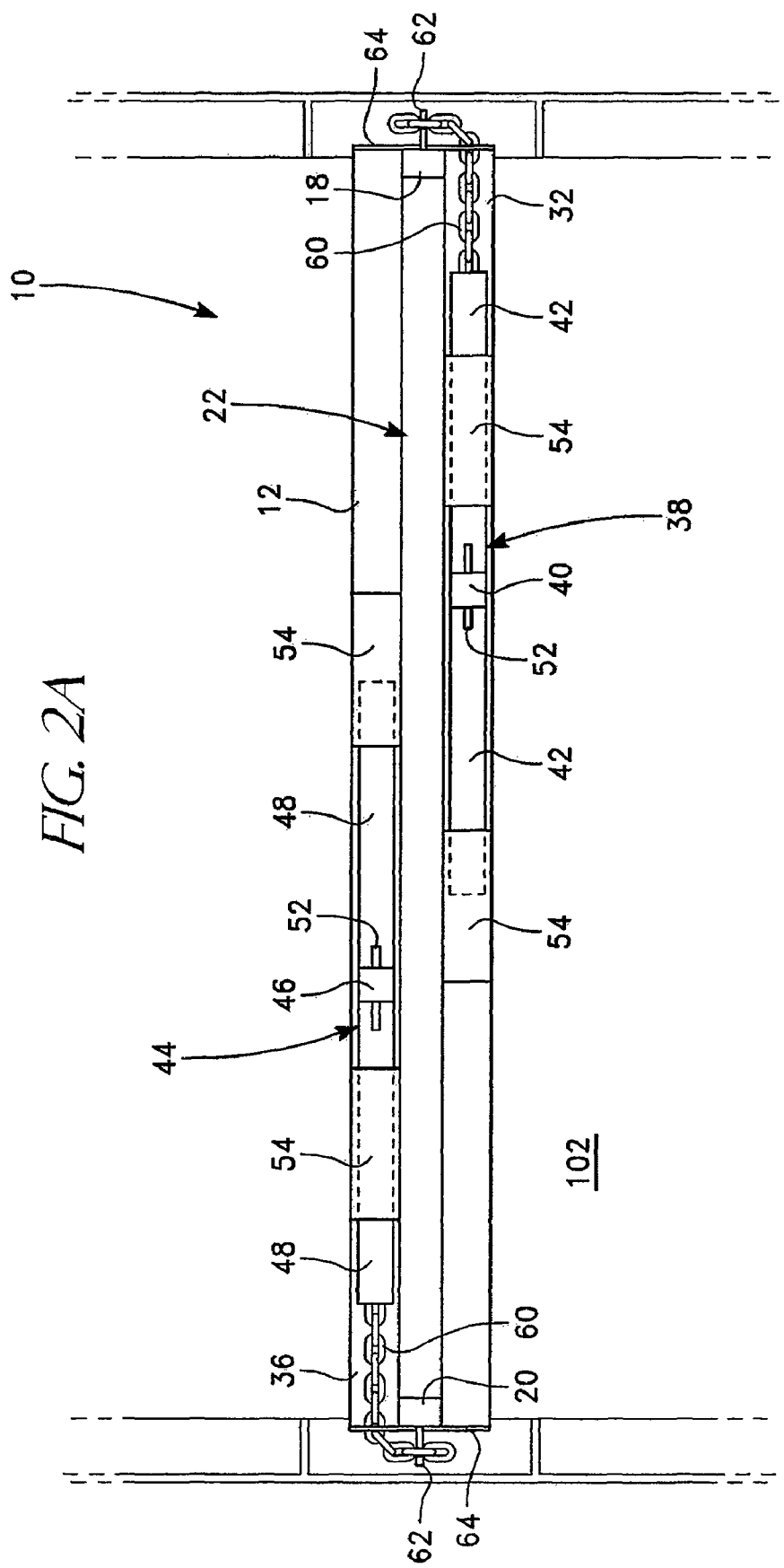
FIG. 2A shows a plan view of the apparatus shown in FIG. 2.

Referring now to FIG. 1, embodiments of the disclosed pipe bunks comprise a front assembly 10 and an opposite facing rear assembly 10' which are used in combination with a flat bed 100 of a transporting conveyance, such as a flat bed truck, for retaining lengths of pipe during transportation. The flat bed 100 comprises a top side 102 and a bottom side 104. The assemblies 10, 10' which are generally identical, may be interchangeable and are hereinafter described as a single unit unless otherwise noted. Each assembly 10 comprises a horizontal base member 12 having a flat top surface 14. The horizontal base member 12 is attached to the top side 102 with attachment means, such as a chain 16 which wraps under the bottom side 104 of the flat bed 100. Chain 16 may be pulled taut with various tensioning means, such as a come-along or other device. Alternatively, the front assembly 10 and rear assembly 10 may be attached to the flat bed 100 by chaining the units to eyelets or other structures available on the trailer or boat deck of the trailer or vessel.

The assembly 10 further comprises first outside vertical member 18 and a second outside vertical member 20 which are attached at opposite ends of a horizontal beam 22. The horizontal beam 22 has a top surface 24, a first vertical side 26 and a second vertical side 28, opposite the first vertical side. The horizontal beam 22 is mounted on the top surface 14 of the horizontal base member 12 in such a manner that a first portion of the horizontal base member 12 extends outwardly from beneath the first vertical side 26. This exposed portion of the horizontal base member 12 defines a first slide surface 32. Likewise, a second portion of the horizontal base member 12 extends outwardly from beneath the second vertical side 28, thereby defining a second slide surface 36.

The assembly 10 further comprises a first slide member 38 which is slidingly disposed on the first slide surface 32. The first slide member 38 has a first inside vertical member 40 which is attached to a first horizontal rail 42. The first inside vertical member 40 is in offset facing relation with the first outside vertical member 18. That is, while the first inside vertical member 40 and the first outside vertical member 18 are facing each other, the two vertical members are offset in the sense that each vertical member is located a different distance from the front 106 of the flat bed 100 and the rear 108 of the flat bed.

Likewise, the assembly 10 comprises a second slide member 44 which is slidingly disposed on the second slide surface 36. The second slide member 44 comprises a second inside vertical member 46 which is attached to a second horizontal rail 48. As with the first inside vertical member 40, the second inside vertical member 46 is in offset facing relation with the second outside vertical member 20. While not functionally necessary, for ease of manufacturing and for a more pleasing appearance, the first slide surface 32 and the second slide surface 36 may have equivalent areas, which is accomplished by having horizontal beam 22 assembled such that it is centered on horizontal base member 12. The first outside vertical member 18, the second outside vertical member 20, the first inside vertical member 40 and the second inside vertical member 46 may be fashioned from square tubing. The square tubing may be various dimensions, but 3"×3" material having ⅜" wall thickness has been found to be acceptable.

The first outside vertical member 18, the second outside vertical member 20, the first inside vertical member 40 and the second inside vertical member 46 may further comprise caps 50, which are sloped inwardly to deflect the tubulars into the pipe bunk as joints of pipe are laid into the bunks. An acceptable slope has been found to be 45 degrees. The first outside vertical member 18, the second outside vertical member 20, the first inside vertical member 40 and the second inside vertical member 46 may further comprise a vertical reinforcement member, such as strong backs 52 for structural reinforcement. Strong backs 52 may comprise flat stock having a thickness of ½ inch and a width of 1½".

Figure 3:
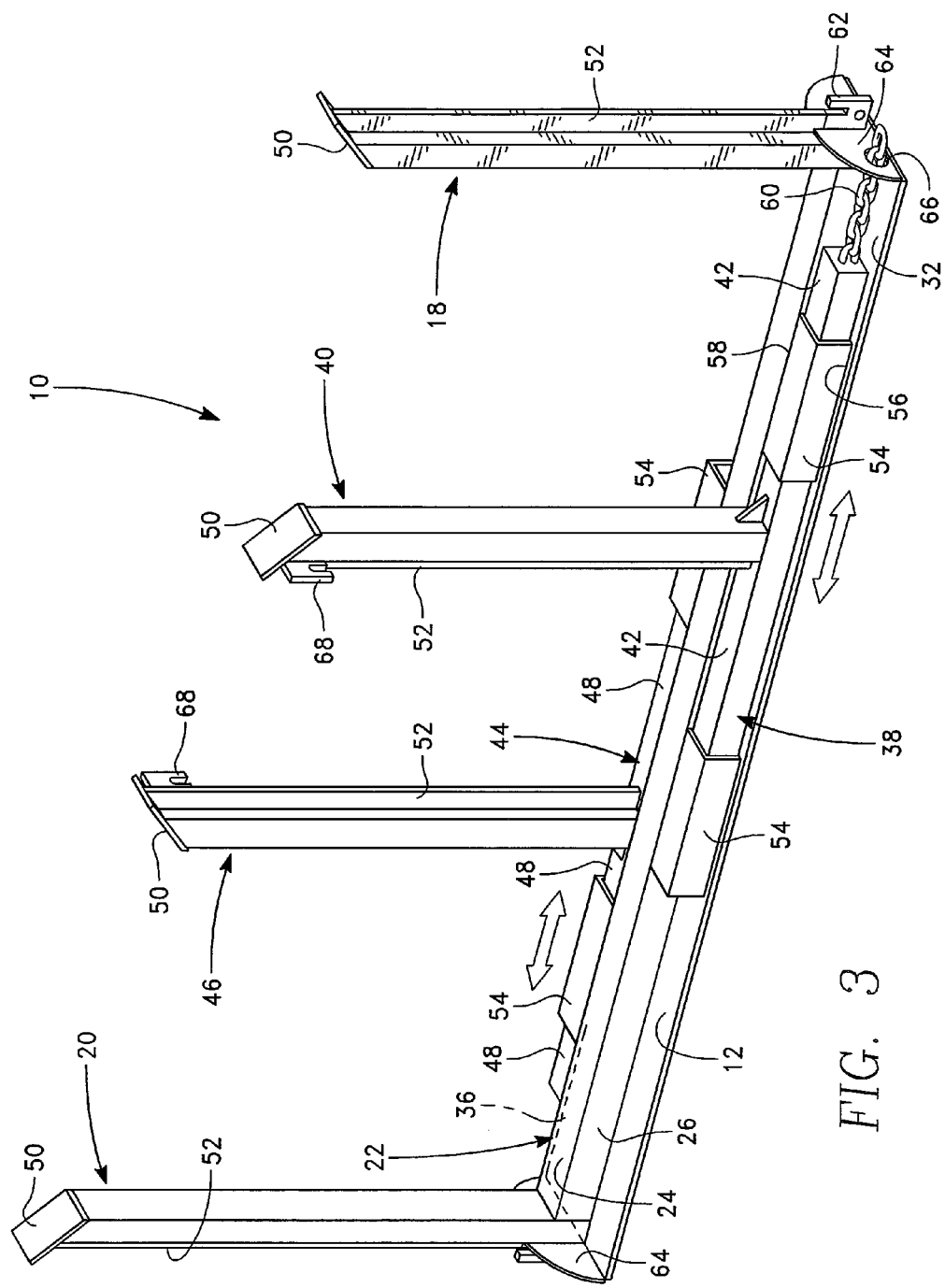
FIG. 3 is a perspective drawing of one pipe bunk assembly, showing the relative motion of the inside vertical members.
Figure 4:
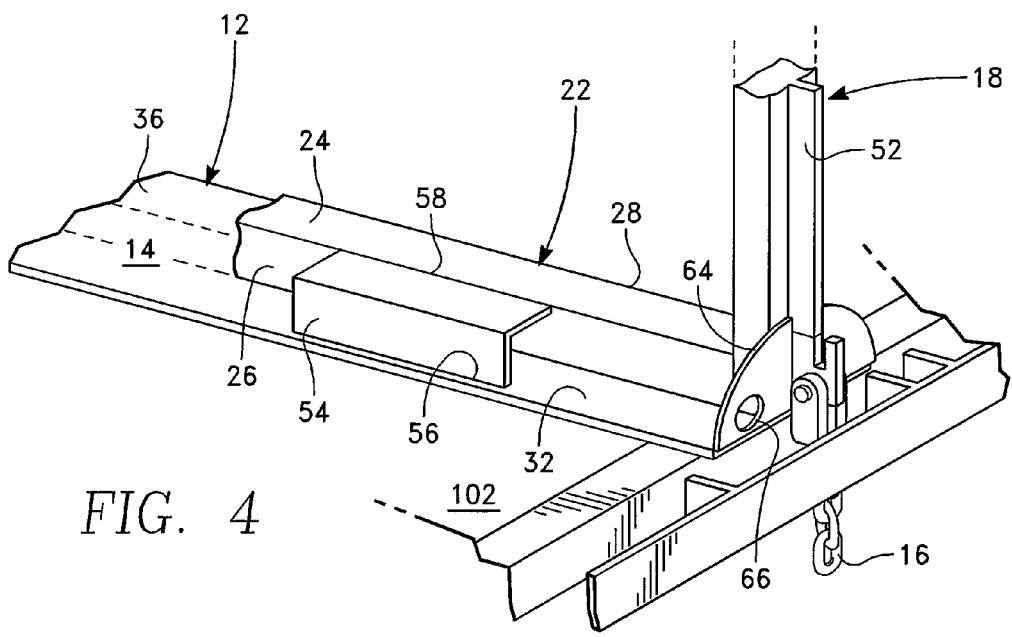
FIG. 4 shows a close-up view of portions of one of the outside vertical members, the horizontal base member, the horizontal beam, guide member and horizontal rail.
Figure 5:
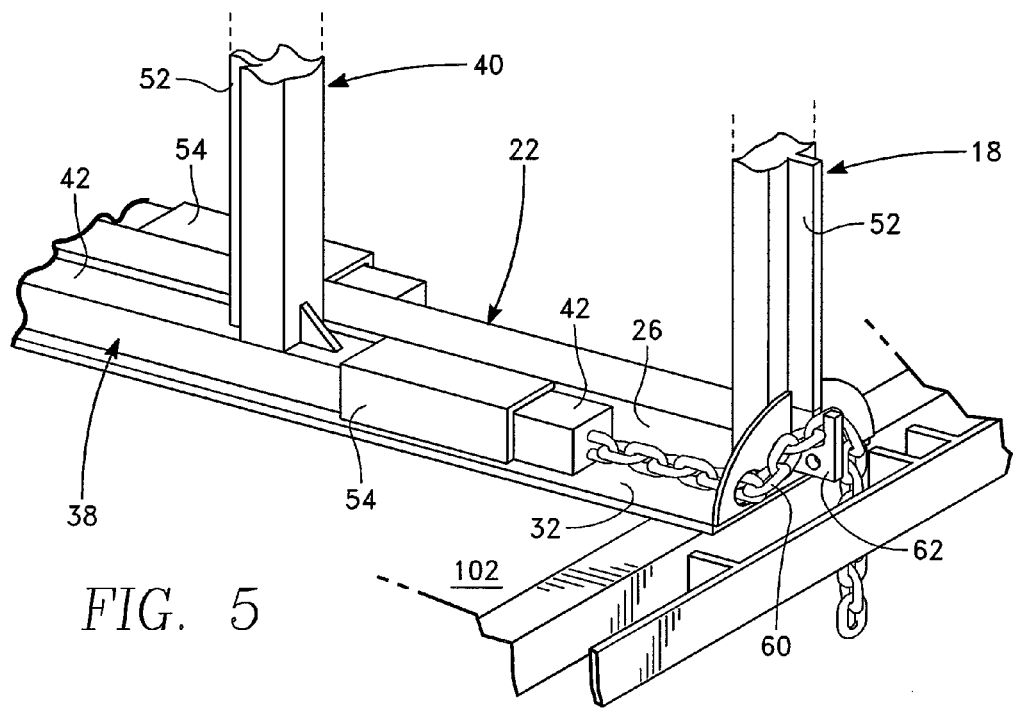
FIG. 5 shows a close-up view of portions of one of the outside vertical members, one of the inside vertical members, the horizontal base member, the horizontal beam, guide member, horizontal rail, and the attachment of a length of chain to the slide member, showing how the chain may be secured within a chain latch.

The slide members 38, 44 are adjustable with respect to the distance of each from the sides of the flat bed 100, such that the distance between first outside vertical member 18 and first inside vertical member 40 is adjustable to accommodate the desired load Likewise, the distance between the second outside vertical member 20 and the second inside vertical member 46 is adjustable. As shown in FIGS. 6-28, a major feature of the pipe bunks is the ability to accommodate a widely diverse range of load configurations, which is accomplished the adjustable nature of slide members 38, 44. This feature is accomplished by inserting the first horizontal rail 42 within at least one guide member 54, which may be configured in an ell-shape. Guide member 54 has a horizontal edge 56 and a vertical edge 58 where the vertical edge is attached to the first vertical side 26 and the horizontal edge is attached to the first slide surface 32 Likewise, second horizontal rail 48 may be inserted within one or more guide members 54 which are attached in a similar fashion to the second vertical side 28 and the second slide surface 36. As shown in FIG. 3, more than one guide member 54 may be utilized to secure slide members 38, 44. When installed, the front assembly 10 and a facing rear assembly 10 provide two segmented sections, A and B, into which portions of heavy columnar construction members, such as pipe and tubulars, may be disposed, such that the columnar construction members are spanning between the front assembly and the bunk and the rear assembly.

Locking means are utilized to secure the slide members 38, 44 to their respective positions relative to the first vertical outside member 18 and the second vertical outside member 20. As shown in the figures, an acceptable form of locking means is the attachment of one end of a length of chain 60 to the end of the first horizontal rail 42 wherein the other end of the length of chain is locked within chain latch 62. Second horizontal rail 48 may be secured in a similar fashion. It is to be appreciated that other locking means may be utilized, such as a series of apertures within the horizontal rail members 42, 48 and guide members 54, wherein pins are utilized to lock a slide member to a guide member.

An end member 64 may be attached to each side of first vertical outside member 18 and to the end of horizontal base member 12. End member 64 may have an aperture 66 for passing of the length of chain 60, allowing easier access to chain latch 62 and providing a guide for the chain. As shown in the figures, end members 64 may be placed at each vertical outside member 18, 20. The tops of the first outside vertical member 18, the second outside vertical member 20, the first inside vertical member 40 and the second inside vertical member 46 may comprise hook 68 for securing a chain, cable, etc. going over the top of each load of pipe within segmented section A or B.

FIGS. 6 through 28 show various load configurations for different size tubulars. Assuming a maximum flat bed capacity of 50,000 lbs., the disclosed pipe bunks may be utilized to carry specific configurations of loads of pipe, thus providing a method by which the disclosed apparatus may be utilized to carry pipe. As shown in these figures, rows of pipe are loaded into each section A and B defined by outside vertical members 18, 20 and inside vertical members on the front assembly 10 and rear assembly 10', where the layers of pipe are separated by dividers 110.

Figure 6:
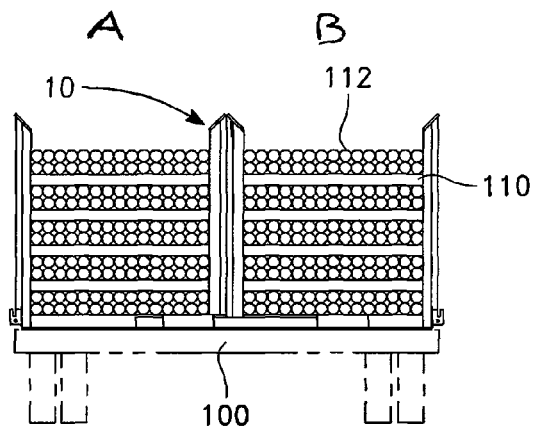
FIGS. 6 through 27 show various load configurations for different size tubulars on a flat bed truck utilizing the disclosed apparatus, where each load comprises the same size pipe.

FIG. 6 depicts a load of 300 joints of 2⅜ inch pipe 112 having a weight of 4.6 lbs per foot, with each joint approximately 31 feet in length. FIG. 6 shows how the disclosed system may be utilized to carry this load.

Figure 7:
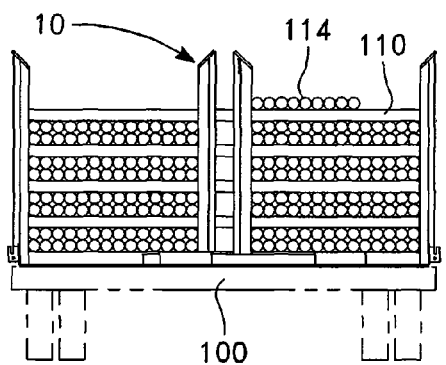

FIG. 7 depicts a load of 233 joints of 2⅞ inch pipe 114 having a weight of 6.5 lbs per foot, with each joint approximately 31 feet in length. FIG. 7 shows how the disclosed system may be utilized to carry this load.

Figure 8:
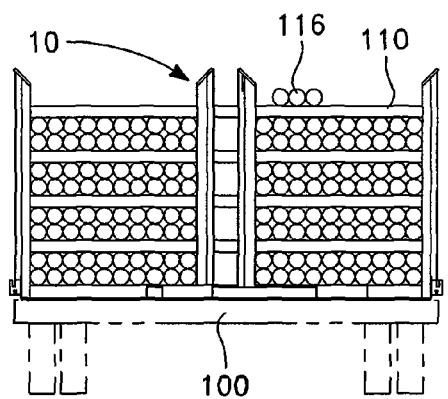

FIG. 8 depicts a load of 163 joints of 3½ inch pipe 116 having a weight of 9.3 lbs per foot, with each joint approximately 31 feet in length. FIG. 8 shows how the disclosed system may be utilized to carry this load.

Figure 9:
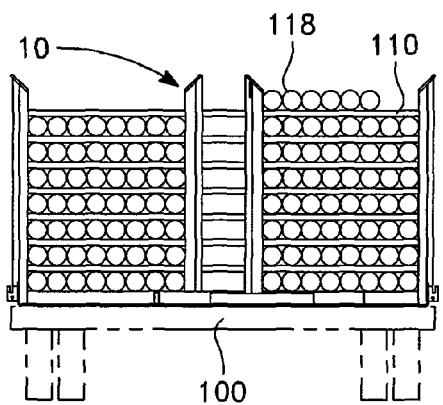

FIG. 9 depicts a load of 118 joints of 4½ inch pipe 118 having a weight of 12.75 lbs per foot, with each joint approximately 31 feet in length. FIG. 9 shows how the disclosed system may be utilized to carry this load.

Figure 10:
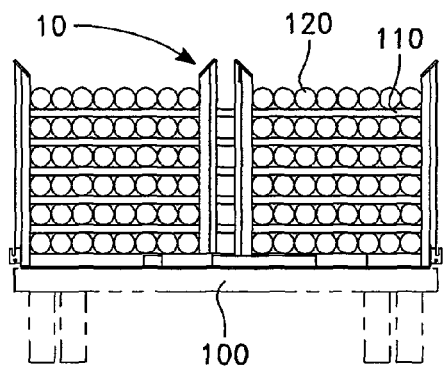

FIG. 10 depicts a load of 96 joints of 4½ inch pipe 120 having a weight of 11.6 lbs per foot, with each joint approximately 31 feet in length. FIG. 10 shows how the disclosed system may be utilized to carry this load.

Figure 11:
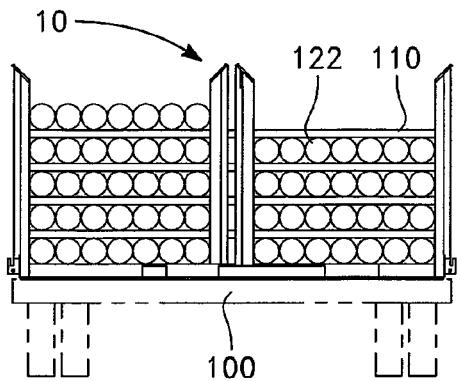

FIG. 11 depicts a load of 63 joints of 5½ inch pipe 122 having a weight of 17.0 lbs per foot, with each joint approximately 31 feet in length. FIG. 11 shows how the disclosed system may be utilized to carry this load.

Figure 12:
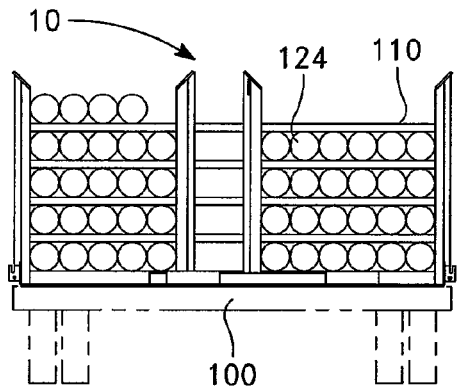

FIG. 12 depicts a load of 48 joints of 7 inch pipe 124 having a weight of 23.0 lbs per foot, with each joint approximately 31 feet in length. FIG. 12 shows how the disclosed system may be utilized to carry this load.

Figure 13:
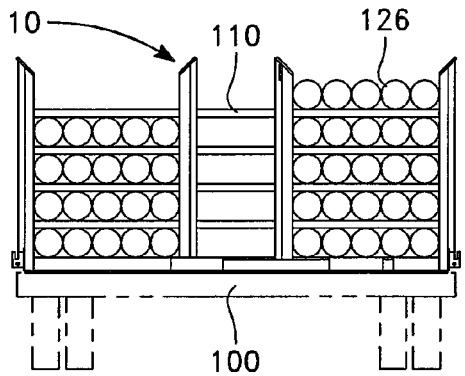

FIG. 13 depicts a load of 45 joints of 7⅝ inch pipe 126 having a weight of 26.4 lbs per foot, with each joint approximately 31 feet in length. FIG. 13 shows how the disclosed system may be utilized to carry this load.

Figure 14:
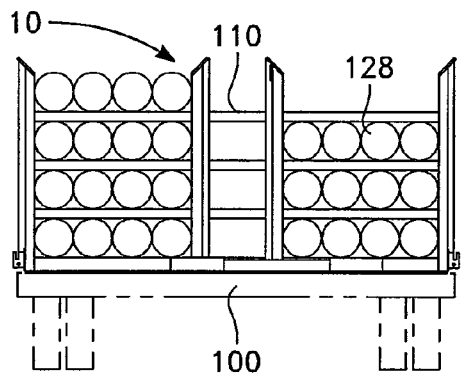

FIG. 14 depicts a load of 28 joints of 9⅝ inch pipe 128 having a weight of 36.0 lbs per foot, with each joint approximately 31 feet in length. FIG. 14 shows how the disclosed system may be utilized to carry this load.

Figure 15:
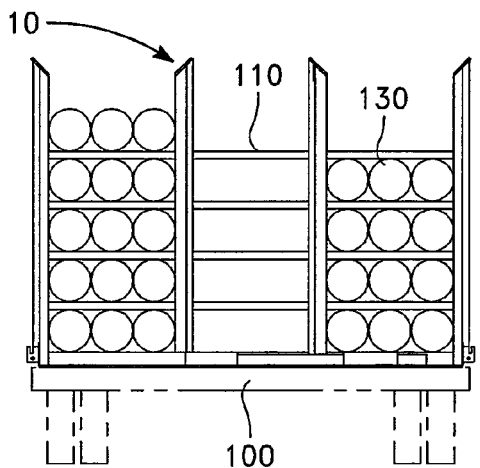

FIG. 15 depicts a load of 27 joints of 10¾ inch pipe 130 having a weight of 40.5 lbs per foot, with each joint approximately 31 feet in length. FIG. 6 shows how the disclosed system may be utilized to carry this load.

Figure 16:
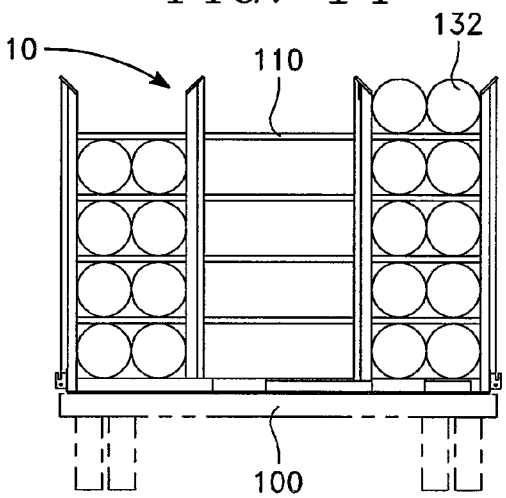

FIG. 16 depicts a load of 18 joints of 13⅜ inch pipe 132 having a weight of 54.5 lbs per foot, with each joint approximately 31 feet in length. FIG. 16 shows how the disclosed system may be utilized to carry this load.

Figure 17:
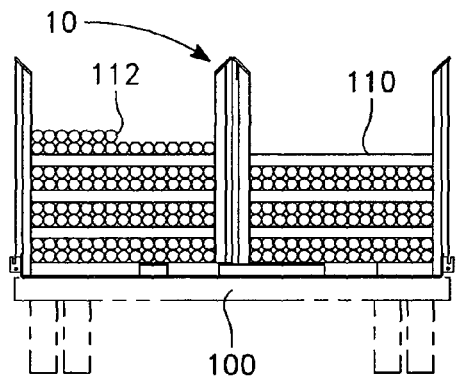

FIG. 17 depicts a load of 217 joints of 2⅜ inch pipe 112 having a weight of 4.6 lbs per foot, with each joint approximately 31 feet in length. FIG. 17 shows how the disclosed system may be utilized to carry this load.

Figure 18:
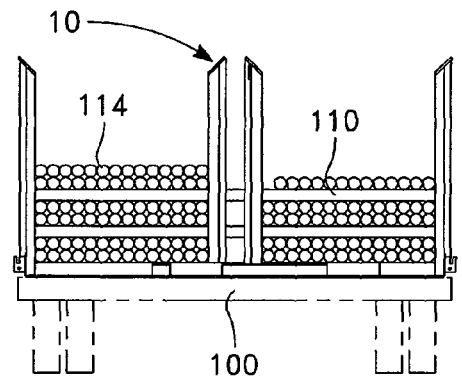

FIG. 18 depicts a load of 153 joints of 2⅞ inch pipe 114 having a weight of 6.5 lbs per foot, with each joint approximately 31 feet in length. FIG. 18 shows how the disclosed system may be utilized to carry this load.

Figure 19:
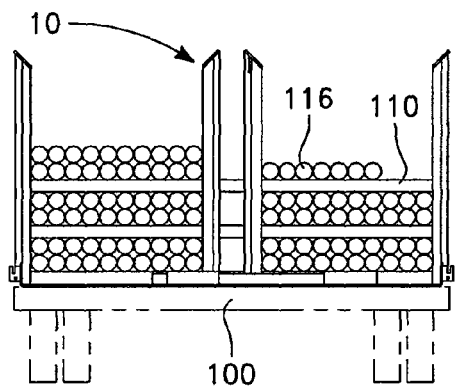

FIG. 19 depicts a load of 107 joints of 3½ inch pipe 116 having a weight of 9.3 lbs per foot, with each joint approximately 31 feet in length. FIG. 19 shows how the disclosed system may be utilized to carry this load.

Figure 20:
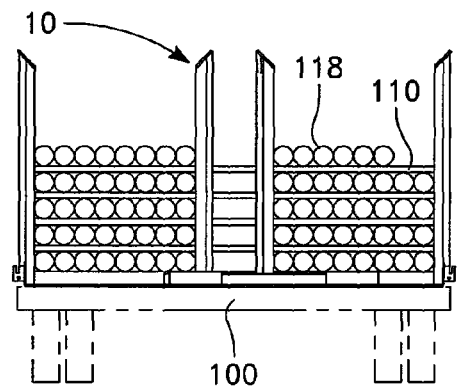

FIG. 20 depicts a load of 78 joints of 4½ inch pipe 118 having a weight of 12.75 lbs per foot, with each joint approximately 31 feet in length. FIG. 20 shows how the disclosed system may be utilized to carry this load.

Figure 21:
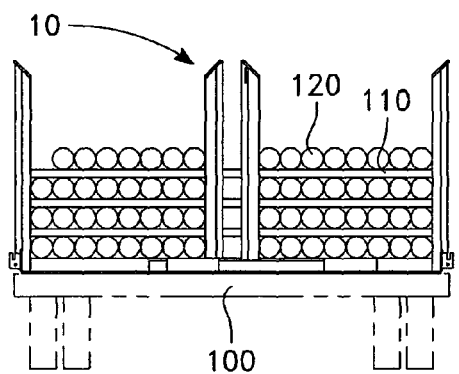

FIG. 21 depicts a load of 63 joints of 4½ inch pipe 120 having a weight of 11.6 lbs per foot, with each joint approximately 31 feet in length. FIG. 21 shows how the disclosed system may be utilized to carry this load.

Figure 22:
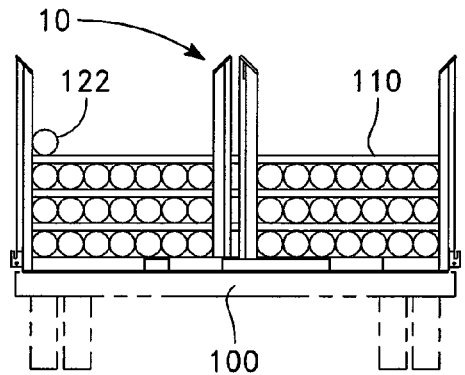

FIG. 22 depicts a load of 43 joints of 5½ inch pipe 122 having a weight of 17.0 lbs per foot, with each joint approximately 31 feet in length. FIG. 22 shows how the disclosed system may be utilized to carry this load.

Figure 23:
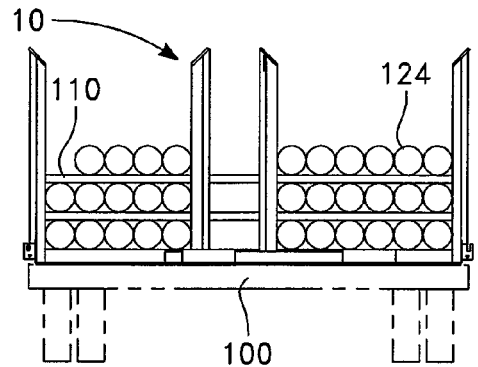

FIG. 23 depicts a load of 32 joints of 7 inch pipe 124 having a weight of 23.0 lbs per foot, with each joint approximately 31 feet in length. FIG. 23 shows how the disclosed system may be utilized to carry this load.

Figure 24:
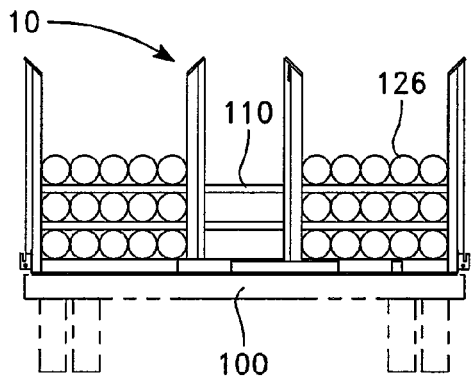

FIG. 24 depicts a load of 30 joints of 7⅝ inch pipe 126 having a weight of 26.4 lbs per foot, with each joint approximately 31 feet in length. FIG. 24 shows how the disclosed system may be utilized to carry this load.

Figure 25:
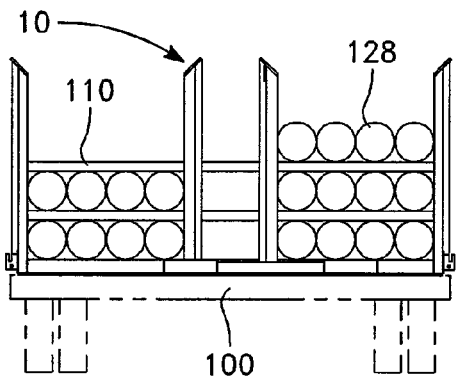

FIG. 25 depicts a load of 20 joints of 9⅝ inch pipe 128 having a weight of 36 lbs per foot, with each joint approximately 31 feet in length. FIG. 25 shows how the disclosed system may be utilized to carry this load.

Figure 26:
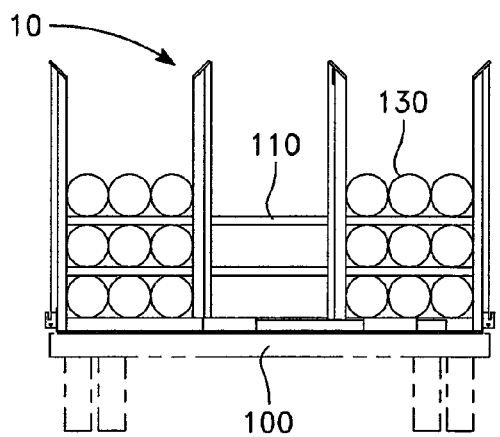

FIG. 26 depicts a load of 18 joints of 10¾ inch pipe 130 having a weight of 40.5 lbs per foot, with each joint approximately 31 feet in length. FIG. 26 shows how the disclosed system may be utilized to carry this load.

Figure 27:
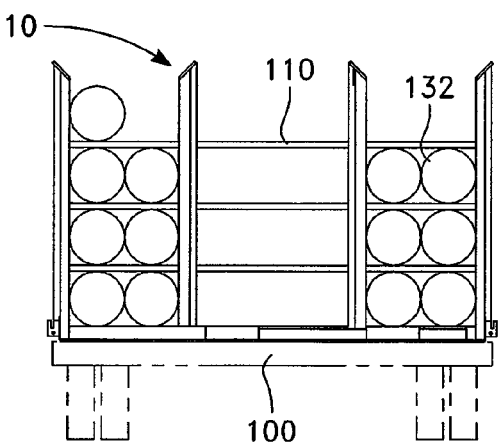

FIG. 27 depicts a load of 13 joints of 13⅜ inch pipe 132 having a weight of 54.5 lbs per foot, with each joint approximately 31 feet in length. FIG. 27 shows how the disclosed system may be utilized to carry this load.

Figure 28:
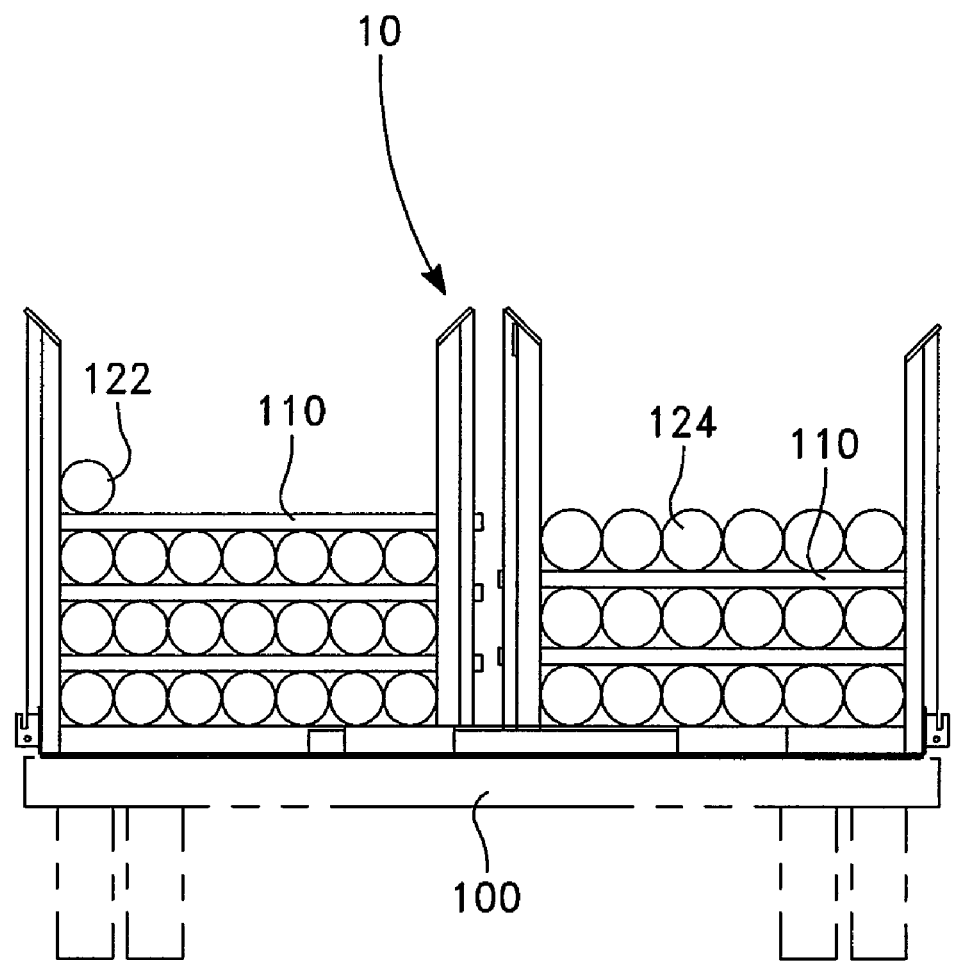
FIG. 28 shows one of many different possible load configurations where the single load comprises pipe of different sizes.

FIG. 28 depicts a mixed load of 22 joints of 5½ inch pipe 122 having a weight of 17.0 lbs per foot and 18 joints of 7 inch pipe 124 having a weight of 23.0 lbs per foot, with each joint approximately 31 feet in length. FIG. 28 shows one possible configuration for a mixed load of tubulars which may be transported utilizing the disclosed system to carry the load.

As shown in FIGS. 6-28, the bunks will generally be loaded in a manner that the loads within the respective sections A and B are roughly equivalent, and inside vertical members 40, 46 adjusted such that each is approximately the same distance from its respective outside vertical member 18, 20 on the front assembly 10 and rear assembly 10'. This configuration provides a balanced load for the transportation conveyance. Pipe lengths may be loaded into the respective sections A and B such that a row completely fills the space between the inside vertical members 40, 46 and the outside vertical members 18, 20, as exemplified by FIG. 6. In this configuration, additional tie-downs may not be required. Where there are extra lengths of pipe, such as depicted in FIG. 7, the extra lengths of pipe will be separately tied down to secure the load.

A method of transporting tubulars comprises loading the tubulars onto a flatbed having the pipe bunks described above, where the tubulars are loaded into divided parallel sections A and B which are formed by front assembly 10 and a facing rear assembly 10', where the tubulars span between the front assembly and the facing rear assembly. Section A is generally defined by first outside vertical member 18 and first inside vertical member 40 of front assembly 10 and by the comparable members of rear assembly 10'. Similarly, Section B is defined by second outside vertical member 20 and second inside vertical member 46 of front assembly 10 and by the comparable members of rear assembly 10'. Because of the ability to change the positions of the first inside vertical members 40 and the second inside vertical members 46, Section A and Section B have variable widths and may be configured to organize the tubulars and load them, such as illustrated in the load configurations shown in FIGS. 6-28.

In loading tubulars a method of loading the tubulars is disclosed which provides for even loading of the tubulars, for accounting for the weight of the tubulars to prevent overloading of the transporting conveyance, and for allowing for the relatively easy attachment of a crane sling to the tubulars. This method utilizes a messenger line wrapped around each bundle of tubulars as the bundle is loaded into its designated section of the pipe bunks, and utilizing the messenger line for pulling the crane sling around the bundle.

While the above is a description of various embodiments of the present invention, further modifications may be employed without departing from the spirit and scope of the present invention. For example, the size, shape, and/or material of the various components may be changed as desired. Thus the scope of the invention should not be limited by the specific structures disclosed. Instead the true scope of the invention should be determined by the following claims.

What is claimed is:

1. A system for retaining lengths of pipe during transportation in combination with a flat bed of a transporting conveyance, the flat bed comprising a top side and a bottom side, the system comprising:

a pair of opposite facing assemblies into which lengths of pipe may be disposed, each assembly comprising:

a horizontal base member having a flat top surface attached to the top side with attachment means;

a first outside vertical member and a second outside vertical member attached at opposite ends of a horizontal beam, the horizontal beam having a top surface, a first vertical side and a second vertical side, the horizontal beam mounted on the top surface of the horizontal base member such that a first portion of the horizontal base member outwardly extends from beneath the first vertical side defining a first slide surface and a second portion of the horizontal base member outwardly extends from beneath the second vertical side defining a second slide surface;

a first slide member slidingly disposed on the first slide surface, the first slide member comprising a first inside vertical member attached to a first horizontal rail, the first inside vertical member in offset facing relation with the first outside vertical member; and a second slide member slidingly disposed on the second slide surface, the second slide member comprising a second inside vertical member attached to a second horizontal rail, the second inside vertical member in offset facing relation with the second outside vertical member.

2. The system of claim 1 wherein the first slide surface and the second slide surface have equivalent areas.

3. The system of claim 1 wherein the first horizontal rail is slidingly inserted within at least one ell-shaped guide member having a horizontal edge and a vertical edge, wherein the vertical edge is attached to the first vertical side and the horizontal edge is attached to the first slide surface.

4. The system of claim 1 wherein the second horizontal rail is slidingly inserted within at least one ell-shaped guide member having a horizontal edge and a vertical edge, wherein the vertical edge is attached to the second vertical side and the horizontal edge is attached to the second slide surface.

5. The system of claim 1 wherein the first outside vertical member, the second outside vertical member, the first inside vertical member, and the second inside vertical member each comprise square tubing.

6. The system of claim 5 wherein the first outside vertical member, the second outside vertical member, the first inside vertical member, and the second inside vertical member each comprise a vertical reinforcement member.

7. The system of claim 1 wherein the first outside vertical member, the second outside vertical member, the first inside vertical member, and the second inside vertical member each comprise an angled top.

8. The system of claim 7 wherein each angled top comprises a cap member.

9. The system of claim 1 wherein the first slide member comprises an outside end, the system further comprising a length of chain attached to the outside end of the first slide member.

10. The system of claim 9 further comprising a chain guide comprising a plate member attached to the first outside vertical member and the first slide surface, the plate member comprising a hole through which a portion of the length of chain is passed.

11. The system of claim 10 further comprising a chain latch attached to the first outside vertical member for capturing a portion of the length of chain.

* * * * *